(12) United States Patent
Sakamoto

(10) Patent No.: US 7,671,312 B2
(45) Date of Patent: Mar. 2, 2010

(54) OPTICAL PICKUP SYSTEM, OPTICAL SYSTEM, AND OPTICAL INFORMATION RECORDING MEDIUM

(75) Inventor: Katsuya Sakamoto, Saitama (JP)

(73) Assignee: Konica Minolta Opto, Inc., Tokyo (JP)

( * ) Notice: Subject to any disclaimer, the term of this patent is extended or adjusted under 35 U.S.C. 154(b) by 504 days.

(21) Appl. No.: 11/630,945

(22) PCT Filed: Jun. 16, 2005

(86) PCT No.: PCT/JP2005/011054

§ 371 (c)(1),
(2), (4) Date: Dec. 26, 2006

(87) PCT Pub. No.: WO2006/001215

PCT Pub. Date: Jan. 5, 2006

(65) Prior Publication Data

US 2008/0074981 A1    Mar. 27, 2008

(30) Foreign Application Priority Data

Jun. 29, 2004    (JP)    ............................. 2004-192137

(51) Int. Cl.
*G11B 7/00*    (2006.01)
(52) U.S. Cl. .................. 250/201.5; 250/216; 369/112.2
(58) Field of Classification Search ............. 250/201.5, 250/216; 369/103, 108, 110.04, 112.07, 369/112.1, 112.2
See application file for complete search history.

(56) References Cited

U.S. PATENT DOCUMENTS 7,206,276 B2 *    4/2007    Kimura et al. ......... 369/112.08

FOREIGN PATENT DOCUMENTS

| JP | 7-302437 A | 11/1995 |
| JP | 10-31841 A | 2/1998 |
| JP | 10-162411 A | 6/1998 |
| JP | 2001-134961 A | 5/2001 |
| JP | 2003-066324 | 3/2003 |
| JP | 2003-294926 A | 10/2003 |
| JP | 2004-158113 A | 6/2004 |

* cited by examiner

*Primary Examiner*—Georgia Y Epps
*Assistant Examiner*—Tony Ko
(74) *Attorney, Agent, or Firm*—Cohen Pontani Liberman & Pavane LLP

(57) ABSTRACT

The present invention provides an optical pickup system including a first light source emitting a light flux with a first wavelength; a second light source emitting a light flux with a second wavelength; and a light-converging optical system converging the light flux with the first wavelength from the first light source with a first magnification onto a first reference surface set at a first depth, and converging the light flux with the second wavelength from the second light source with a second magnification onto a second reference surface set at a second depth. The first and second wavelengths, the first and second depths, and the first and second magnifications satisfy: a first condition according to an aberration and a second condition according to a working distance.

13 Claims, 4 Drawing Sheets

OPTICAL PICKUP SYSTEM, OPTICAL SYSTEM, AND OPTICAL INFORMATION RECORDING MEDIUM

RELATED APPLICATIONS

This is a U.S. National Phase Application under 35 USC 371 of International Application PCT/JP2005/011054, filed on Jun. 16, 2005.

TECHNICAL FIELD

The present invention relates to an optical pickup system for conducting recording and/or reproducing of optical information for an optical information recording medium.

BACKGROUND ART

There have been developed and manufactured various types of optical pickup systems capable of conducting reproducing and recording of information for a plurality of optical information recording media such as CD and DVD, and they have become widespread in general. As an optical pickup apparatus of this kind, there exist, for example, those each converging light fluxes emitted from a pair of light sources each having a different wavelength onto a pair of information recording media each being different from others (see Patent Document 1). In this optical pickup apparatus, a diffractive optical surface is formed on any one of optical elements on an optical path, and a difference of the diffraction orders is utilized to conduct recording and reproducing of information with the same working distance for different information recording media each having a protective substrate with a different thickness.

Further, there exist optical information recording media of types to record information by using holography. Each of the optical information recording media has a recording layer for hologram recording; and a reflection layer formed immediately under the recording layer and including a positioning mark for a hologram recording area (see Patent Document 2). In this information recording medium, it is possible to attain speeding up of information reproducing or the like, because information is recorded and reproduced simultaneously with positioning by using the mark formed on the reflection layer.

Patent Document 1: TOKUKAI No. 2003-66324
Patent Document 2: TOKUKAI No. 2004-158113

However, a diffractive optical surface formed in the former causes considerable light loss is on the diffractive optical surface, and increases a cost of a light-converging optical system.

Further, when a positioning mark is provided as in the latter, it is ordinarily considered to set detecting light for the mark and recording light for hologram to have different wavelengths each other. In other words, it is necessary to detect the focal points with a different wavelengths because it is hard to adjust the focal point using with light for recording and reproducing of hologram, resulting in the necessity to make working distances respectively for both wavelengths agree each other.

DISCLOSURE OF INVENTION

With a background of the foregoing, an object of the present invention is to provide an optical pickup system which can equalize working distances for a pair of light fluxes having different wavelengths without sacrificing accuracy, without using a diffractive optical surface which tends to cause loss of quantity of light. Further object of the invention is to provide an optical system for optical pickup and an optical information recording medium, both incorporated favorably in the optical pickup system of this kind.

To solve the above problems, an optical pickup system according to the present invention includes: (a) a first light source emitting a light flux with a first wavelength; (b) a second light source emitting a light flux with a second wavelength which is different from the first wavelength; and (c) a light-converging optical system converging the light flux with the first wavelength from the first light source with a first magnification onto a first reference surface set at a first depth from a surface of an optical information recording medium, and converging the light flux with the second wavelength from the second light source with a second magnification onto a second reference surface set at a second depth which is different from the first depth. The optical pickup system is configured so that (d) the first and second wavelengths, the first and second depths, and the first and second magnifications satisfy: a first condition that an aberration generated when the light flux from the first light source is converged onto the first reference surface is substantially a same to an aberration generated when the light flux from the second light source is converged onto the second reference surface; and a second condition that a working distance of the light-converging optical system converging a light flux from the first light source onto the first reference surface is substantially a same to a working distance of the light-converging optical system converging a light flux from the second light source onto the second reference surface.

Though "the optical pickup system" includes an optical information recording medium housing therein a recording surface in principle, in the foregoing, it also includes an occasion wherein the optical pickup system means only an optical pickup apparatus conducting writing and reading of information for an optical information recording medium. Further, in the foregoing, "magnification" expresses a magnification of the aforesaid light-converging optical system. Further, "aberration" in the case where a light flux emitted from the first light source is converged onto the first reference surface typically means spherical aberration that is directly related to detection accuracy. However, the "aberration" can also refer coma, astigmatism and other aberrations, and can also be an aberration value in the sum total representing a least mean square of these aberrations.

In the aforesaid optical pickup system, the values of two of the aforesaid parameters are determined so that, between when converging light employing the first light source and when converging light employing the second light source, aberrations of a light-converging optical system may agree with each other and working distances may also agree with each other. Therefore, it provides the optical pickup system converging a light flux having the first wavelength on the first reference surface at sufficient luminance and converging a light flux having the second wavelength on the second reference surface at sufficient luminance, although the light-converging optical systems are under the same condition. Therefore, recording and reproducing with the first wavelength and those with the second wavelength can be attained accurately under the same conditions. In this case, each optical surface of the light-converging optical system can be constituted with a refractive surface because there is no need to use a diffractive optical surface for the light-converging optical system. It does not cause a problem of light loss. Incidentally, in the aforesaid explanation, the expression that "the light-converging optical systems are under the same condition" means that the circumstances of arrangement including a working distance (namely, a distance from the surface of an optical information recording medium to the light-converging optical system) are under the same condition.

In an embodiment of the above optical pickup system, the first reference surface and the second reference surface are formed in the same optical information recording medium as two layers. In this case, it allows to read the first reference surface or its vicinity, and the second reference surface or its vicinity, at the same time. Alternatively, it allows to write on the first reference surface or its vicinity with reading the second reference surface or its vicinity.

In an embodiment of the above optical pickup system, the optical information recording medium is a recording medium for a hologram. In this case, the embodiment can reproduce information from the first reference surface or its vicinity or record information on the first reference surface or its vicinity, with referring to the mark on the second reference surface or its vicinity.

In an embodiment of the above optical pickup system, the first reference surface and the second reference surface are formed in different two types of optical information recording media, respectively. In this case, the embodiment makes working distances for the different types of optical information recording media almost same. Therefore, it suppresses power consumption in a circuit driving the light-converging optical system and a bobbin supporting the light-converging optical system because there is no need to offset the light-converging optical system along the optical axis when switching optical information recording media and switching wavelengths.

In an embodiment of the above optical pickup system, in the first condition, the aberration generated when the light flux from the first light source is converged onto the first reference surface is substantially zero. In this case, the embodiment also makes the aberration generated when the light flux from the second light source is converged onto the second reference surface in the first condition substantially zero. Therefore, these two light fluxes can be converged with small aberration. In the embodiment that the aberration generated when the light flux from the first light source is converged onto the first reference surface is substantially zero, the aberration is preferably in the range of −0.01 to +0.01 in a wavelength unit for practical use.

In an embodiment of the above optical pickup system, two parameters among the first and second wavelengths, the first and second depth, and the first and second magnification may be defined as variables and the rest four parameters may be defined as predefined values, to determine values of the two parameters so as to satisfy the first condition and the second condition. In this case, the second depth and the second magnification preferably become the two parameters. The embodiment can make the speciation of the system employing the second light source suit to the system employing the first light source easily without changing the specification of the system employing the first light source.

An embodiment of the above optical pickup system, further includes a first photodetector detecting a light flux with the first wavelength through the light-converging optical system, the light flux emitted from the first reference surface; and a second photodetector detecting a light flux with the second wavelength through the light-converging optical system, the light flux emitted from the second reference surface.

In an embodiment of the above optical pickup system, the second reference surface includes a mark for a focus servo operation or a tracking servo operation thereon.

In an embodiment of the above optical pickup system, each optical surface of the light-converging optical system is formed of a refractive surface.

An optical system for optical pickup according to the present invention is an optical system for use in the above optical pickup system, and the optical system includes the light-converging optical system.

An optical information recording medium according to the present invention is an optical information recording medium used for the above optical pickup system, and includes the first and second reference surfaces.

BEST MODE FOR CARRYING OUT THE INVENTION

Figure 1:
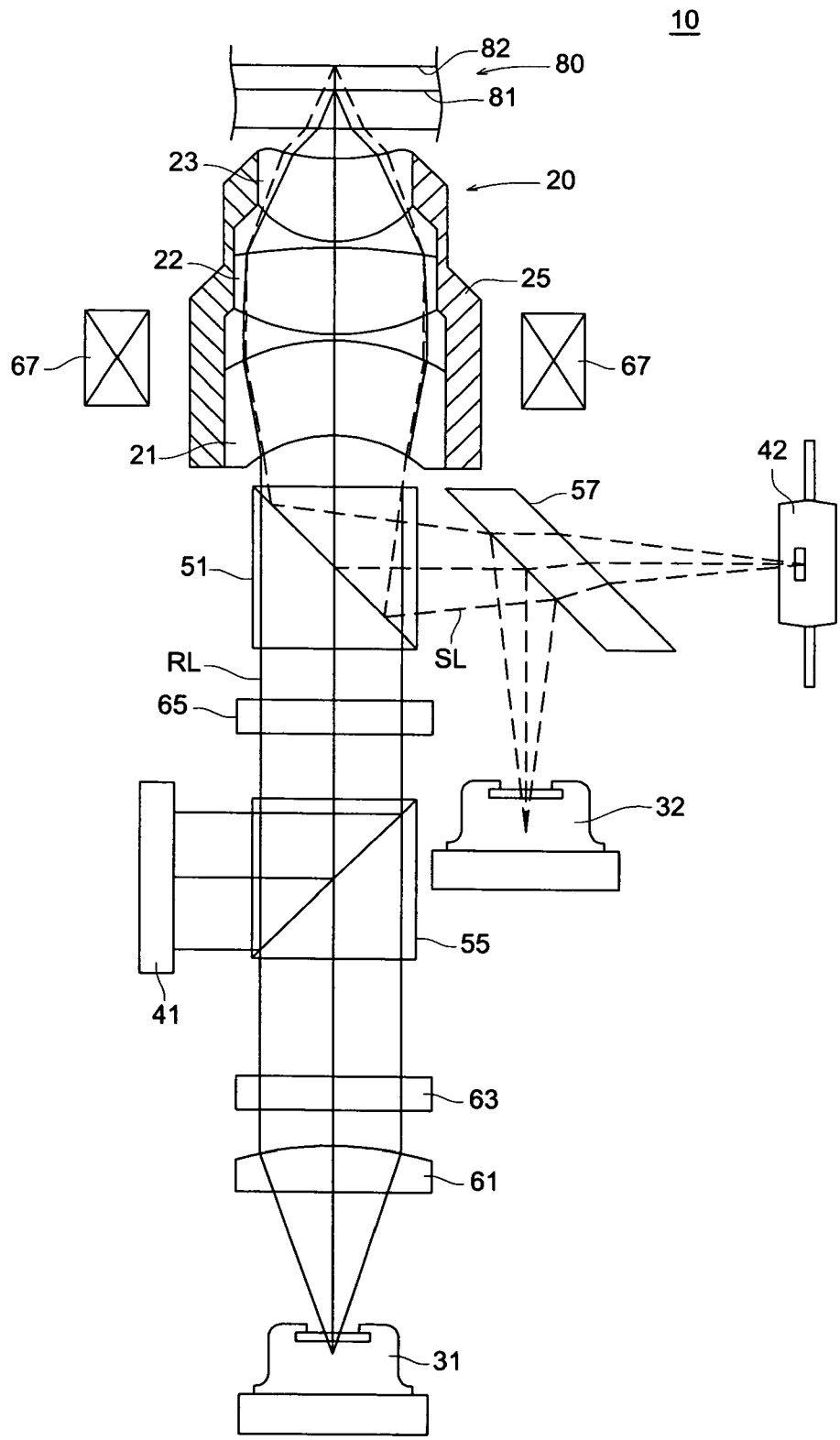
FIG. 1 is a diagram that illustrates a construction of an optical pickup apparatus relating to an embodiment of the invention.

FIG. 1 is a diagram that illustrates a construction of an optical pickup apparatus relating to an embodiment of the invention. This optical pickup apparatus 10 is an apparatus of a hologram recording and reproducing type which is provided with: objective lens 20 for converging light facing optical disc 80 representing an optical information recording medium; first laser light source 31 that is a first light source for recording and reproducing information; second laser light source 32 that is a second light source for a servo operation; first photodetector 41 that receives information light RL coming from optical disc 80; and second photodetector 42 that receives servo light SL coming from optical disc 80.

The optical pickup apparatus 10 is provided with dichroic prism 51 that branches servo light SL from an optical path for information light RL. The optical pickup apparatus 10 is further provided with: polarizing beam splitter 55 that branches information light RL to an optical path toward the first laser light source 31 and to an optical path toward the first photodetector 41; and half mirror 57 that branches servo light SL to an optical path toward the second laser light source 32 and to an optical path toward the second photodetector 42.

In addition to the foregoing, the optical pickup apparatus 10 is provided with: collimator lens 61 that converts information light RL coming from the first laser light source 31 into a collimated light flux; spatial light modulator 63 that gives appropriate two-dimensional light distribution to information light RL; quarter wavelength plate 65 arranged between dichroic prism 51 and polarizing beam splitter 55; and biaxial actuator 67 for focusing and tracking operations. Further, the optical pickup apparatus 10 includes therein a light source drive circuit that properly operates the first and second laser light sources 31 and 32; a sensor drive circuit that properly operates the first and second photodetectors 41 and 42; and a displacement drive circuit that operates biaxial actuator 67.

In the foregoing, optical systems such as objective lens 20, dichroic prism 51, polarizing beam splitter 55, half mirror 57 and collimator lens 61 forms a light-converging optical system for converging respective light fluxes emitted respectively from both laser light sources 31 and 32 to different depths in optical disc 80.

In optical pickup apparatus 10 in FIG. 1, objective lens 20 has first through third lenses 21-23 and holder 25 that integrally fixes these first through third lenses 21-23 as one body, which is driven by biaxial actuator 67 to be displaced slightly in the optical axis direction and the tracking direction that is perpendicular to the optical axis direction. This objective lens 20 has NA on the optical disc 80 side which is, for example, 0.5.

First laser light source 31 is configured to generate a light flux having a wavelength of first wavelength $\lambda_1$ (specifically, for example, green information light RL) as recording and reproducing light, which enables reproducing of hologram image information recorded on an upper part of the first reference surface 81 formed on the surface side of optical disc 80, and/or enables recording of hologram image information on the upper part of the first reference surface 81.

Second laser light source 32 is configured to generate a light flux having a wavelength of second wavelength $\lambda_2$ (specifically, for example, red servo light SL), which enables detection of positional information of a pit (mark) recorded on second reference surface 82 formed in the innermost recess of optical disc 80, and further enables focus servo and tracking servo operations.

First photodetector 41 is an image sensor for detecting information light RL which has returned from the vicinity of the first reference surface 81 of optical disc 80. First photodetector 41 detects, as two-dimensional image information, two-dimensional light and dark distribution of information light RL representing read-out information light, and outputs the light and dark distribution.

Second photodetector 42 is a quadrant sensor or the like for detecting servo light SL which has been reflected on the second reference surface 82 of optical disc 80. Second photodetector 42 detects focus error signal and tracking error signal based on servo light SL, and outputs these error signals.

In the aforesaid optical pickup apparatus 10, existence of collimator lens 61 makes information light RL entering objective lens 20 a collimated light flux, and makes magnification $m_1$ for converging information light RL by objective lens 20 zero. On the other hand, a collimator lens is not provided for the second laser light source 32, and servo light SL entering objective lens 20 is a divergent light flux. Magnification $m_2$ for converging servo light SL by objective lens 20 is slightly smaller than zero. Incidentally, magnification $m_2$ for converging servo light SL by objective lens 20 can be arbitrarily changed by changing arrangement of the second laser light source 32 or by inserting an appropriate lens in front of the second laser light source 32. In the same way, magnification m1 for converging information light RL by objective lens 20 can also be changed by changing arrangement of the first laser light source 31 or by changing a power of collimator lens 61.

Figure 2:
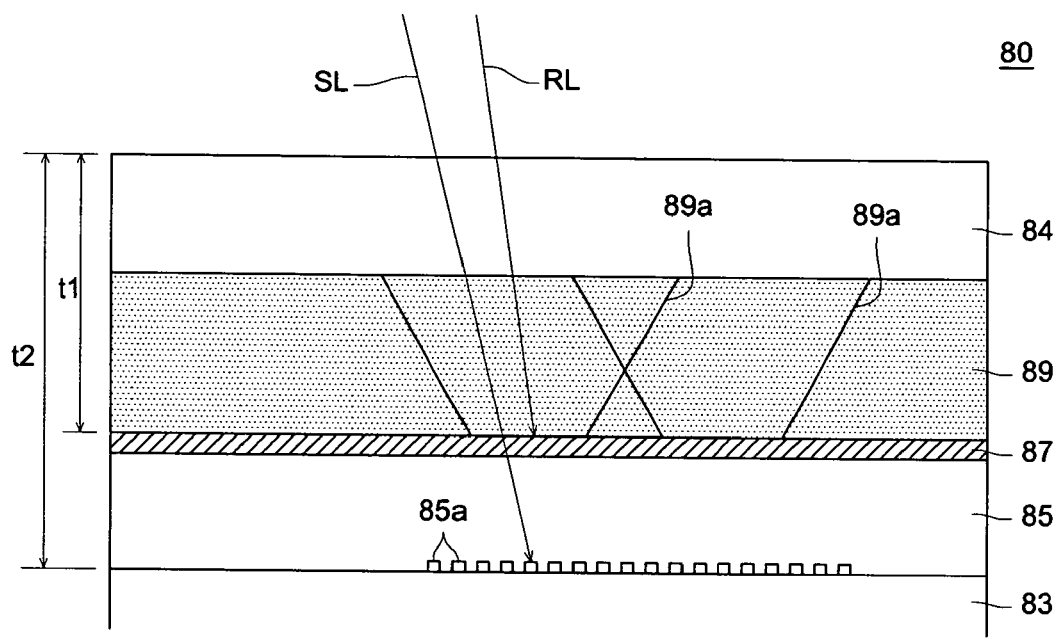
FIG. 2 is an enlarged sectional view that illustrates the recording surface side of an optical disc.

FIG. 2 is an enlarged sectional view illustrating mainly the recording surface side of optical disc 80. Meanwhile, this sectional view shows a cross-section that follows a track concentrically formed in the optical disc 80. The optical disc 80 has a laminated structure wherein pit layer 85, dichroic layer 87 and hologram recording layer 89 are sandwiched between non-recording surface side substrate 83 and recording surface side substrate 84.

On the bottom surface of the pit layer 85, a large number of pits 85a (marks) are formed along the track, and converged servo light SL enters and is reflected. Respective pits 85a formed on the pit layer 85 serve as data of a binary form expressing "0" and "1", and they are arranged at an interval, for example, of 1 to 2 μm. Incidentally, the bottom surface of pit layer 85 corresponds to second reference surface 82 shown in FIG. 1. Second depth $t_2$ representing a distance from the top surface of optical disc 80 to the bottom surface of pit layer 85 is determined by the method explained below, and it is made to be, for example, 1.8 mm.

Dichroic layer 87 has a thickness which may be thought to be substantially zero. Dichroic layer 87 reflects green light and transmits through red light. Namely, servo light SL only arrives at pit layer 85, and information light RL is reflected by dichroic layer 87 and does not arrive at pit layer 85. Meanwhile, the top surface of dichroic layer 87, namely, a bottom surface of hologram recording layer 89 corresponds to first reference surface 81 shown in FIG. 1. First depth $t_1$ representing a distance from the top surface of optical disc 80 to the top surface of dichroic layer 87 is determined by the method explained below, and is made to be, for example, 1.2 mm.

On hologram recording layer 89, there are formed truncated cones 89a at regular intervals by a unit of pits 85a in quantity of ten-odd through several tens of pieces formed on pit layer 85. These truncated cones 89a are formed along the track while having overlapped portions, and a bottom portion of truncated cone 89a has a diameter of about 200 through 300 μm. In other words, each truncated cone 89a is allocated to pits 85a in quantity of about 10 through several tens of pieces which are arranged at regular intervals, and all truncated cones 89a can be read in succession, by taking timing for ten-odd through several tens pieces of pits 85a to be read.

Information light RL entering the hologram recording layer 89 is converged onto a bottom portion of the hologram recording layer 89. In this case, the information light RL illuminates a hologram of interference fringes formed in truncated cone 89a on a volume basis, to generate diffracted light, and/or generates an interference fringe in each truncated cone 89a and records it as a hologram. The hologram of this kind is recorded as a permanent change of optical characteristics such as refractive index and absorptance, which is formed in truncated cone 89a representing a place illuminated by information light RL. Incidentally, the hologram recording layer 89 does not have photosensitivity for servo light SL, and therefore, recorded holograms are not disturbed even when servo light SL enters the truncated cone 89a.

Setting of six parameters concerning spot formation by optical pickup apparatus 10 will be explained as follows. The six parameters in this case include first wavelength $\lambda_1$ of information light RL emitted by first laser light source 31, second wavelength $\lambda_2$ of servo light SL emitted by second laser light source 32, first depth $t_1$ where first reference surface 81 is formed, second depth $t_2$ where second reference surface 82 is formed, magnification $m_1$ for converging information light RL and magnification $m_2$ for converging servo light SL.

In this case, it is assumed that the first specification concerning information light RL is represented by $S_1$ ($f_1$, $\lambda_1$, $NA_1$, $m_1$, $t_1$ and $WD_1$) by which spherical aberration is corrected sufficiently, where an amount of residual aberration is represented by $SA_1$. On the other hand, when it is assumed that the second specification concerning servo light SL is represented by $S_2$ ($f_2$, $\lambda_2$, $NA_2$, $m_2$, $t_2$ and $WD_2$) and $SA_2$ represents an amount of spherical aberration for the second specification $S_2$, a fluctuation of spherical aberration which is residual amount $\Delta SA$ can be approximated linearly with the following expression (1).

$$\Delta SA = SA_2 - SA_1 \approx A(\lambda_1 - \lambda_2) + B(t_1 - t_2) + C(m_1 - m_2) \qquad (1)$$

In the expression above, respective coefficients A, B and C are given by the following expressions.

A: Coefficient of spherical aberration of light-converging optical system caused by wavelength change (λ rms/nm)

B: Coefficient of spherical aberration of light-converging optical system caused by depth change of reference surface (λ rms/nm)

C: Coefficient of spherical aberration of light-converging optical system caused by magnification change (λ rms/nm)

On the other hand, working distance $WD_1$ in the first specification $S_1$ concerning information light RL is made to be equal to working distance $WD_2$ in the second specification $S_2$ concerning servo light SL, where working distance $WD_1$ represents a distance from an end face of objective lens 20 to a surface of optical disc 80 in the first specification $S_1$ concerning information light RL, and working distance $WD_2$ represents a distance from an end face of objective lens 20 to a surface of optical disc 80. Owing to this, hologram information can be detected from truncated cone 89a of the hologram recording layer 89 using information light RL with pit 85a of pit layer 85 detected using servo light SL. Difference ΔWD between working distance $WD_1$ concerning information light RL and working distance $WD_2$ concerning servo light SL can be approximated linearly by the following expression (2).

$$\Delta WD = WD_2 - WD_1 \approx D(\lambda_1 - \lambda_2) + E(t_1 - t_2) + F(m_1 - m_2) \quad (2)$$

In the expression above, respective coefficients D, E and F are given by the following expressions.

D: Coefficient of fluctuation of WD caused by wavelength change (mm)

E: Coefficient of fluctuation of WD caused by depth change of reference surface (mm)

F: Coefficient of fluctuation of WD caused by magnification change (mm)

In the expressions (1) and (2) above, it is understood that ΔWD≈0 (first condition) and ΔSA=0 (second condition) are preferable for obtaining excellent resolving power with a difference between working distances (WD) which is substantially zero, when rays from the light sources are switched. In this case, when satisfying ΔWD≈0 and ΔSA≈0, it is preferable that each of ΔWD and ΔSA is in a range of about −0.01 through +0.01, from a practical viewpoint. In the meantime, in the case of ΔSA≈0, $SA_2$≈0 holds consequently, and aberrations are controlled for both specifications $S_1$ and $S_2$, because spherical aberration amount $SA_1$ in the first specification $S_1$ is made to be nearly zero.

Figure 3:
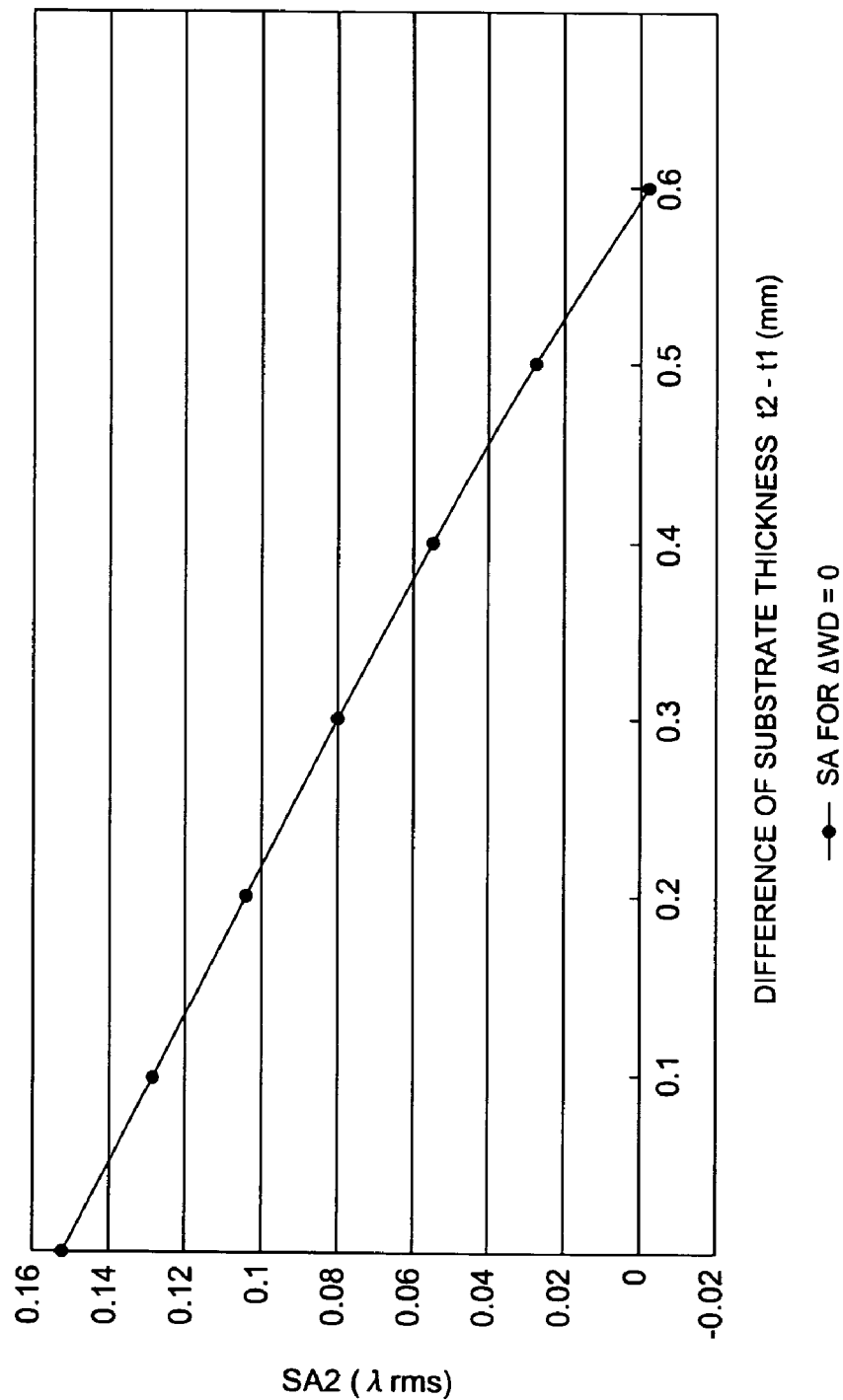
FIG. 3 is a graph illustrating relationship between a thickness of a pit layer and residual aberration.

That is, if four parameters (for example, $\lambda_1, \lambda_2, t_1$ and $m_1$) among six parameters $\lambda_1, \lambda_2, t_1, t_2, m_1$ and $m_2$ are made to be default values or fixed values, and another two parameters (for example, $t_2$ and $m_2$) are made to be undefined values, it is possible to determine the aforesaid two parameters (for example, $t_2$ and $m_2$) so that each of the aforesaid expressions (1) and (2) may be zero. It is understood that the two parameters determined in this way (for example, $t_2$ and $m_2$) do not cause a working distance (WD) difference even when rays from light sources are switched, and excellent resolving power can be maintained. From the aforesaid assumption, a combination to satisfy the aforesaid expressions (1) and (2) is obtained with second depth $t_2$ and second magnification $m_2$ both serving as a variable, when the first specification $S_1$ includes wavelength $\lambda_1$=532 nm, first depth $t_1$=1.2 mm and first magnification $m_1$=0 and the second specification $S_2$ includes wavelength $\lambda_2$=655 nm. As a result, it is understood that difference ΔSA of spherical aberration comes to zero (ΔWD=0) at $t_2-t_1$=0.6 when thickness ($t_2-t_1$) of pit layer 85 is represented by an abscissa axis, as shown by solid lines in the graph of a substrate thickness difference and residual aberration in FIG. 3. That is to say, if thickness ($t_2-t_1$) of pit layer 85 is established under the condition that the thickness agrees with an initial value that is spherical aberration shown with dotted lines, $t_2-t_1$ comes to 0.6, which means second depth=1.8 mm.

Although the foregoing has been the explanation for the specific occasion, if coefficients A, B, C, D, E and F in the expressions (1) and (2) are determined approximately by utilizing simulations, and if four parameters among six parameters $\lambda_1, \lambda_2, t_1, t_2, m_1$ and $m_2$ in both expressions (1) and (2) are made to be constants by considering service conditions, values of another two parameters can be determined univocally, under the condition that each of both expressions is 0. For example, it is possible to optimize depth $t_1$ and depth $t_2$ under the assumption that parameters other than depth $t_1$ and depth $t_2$ are fixed and each of both expressions (1) and (2) is made to be zero. In this case, a thickness of each layer constituting optical disc 80 is determined by adjusting it to specifications of optical pickup apparatus 10. Further, for example, it is possible to optimize magnifications $m_1$ and $m_2$ under the assumption that parameters other than magnifications $m_1$ and $m_2$ are fixed and each of both expressions (1) and (2) is made to be zero. In this case, an optical system constituting optical pickup apparatus 10 is designed to be adjusted to specifications of optical disc 80.

Operations of optical pickup apparatus 10 shown in FIG. 1 will be explained as follows. First, when recording and reproducing information from optical disc 80, a laser beam is emitted from second laser light source 32. A light flux emitted from the second laser light source 32 enters objective lens 20 through half mirror 57 and dichroic prism 51, and is converged onto second reference surface 82 of optical disc 80 by the objective lens 20. The light flux is modulated by pits and reflected on the second reference surface 82, and the light flux goes backward through the objective lens 20 and the dichroic prism 51. Then, the light flux is transmitted through half mirror 57 to enter second photodetector 42. By using output signals of second photodetector 42, a present detection position of optical disc 80 can be specified.

A laser beam is emitted also from first laser light source 31 to be in parallel with the foregoing. A laser beam emitted from the first laser light source 31 is collimated by collimator lens 61, and is transmitted through polarizing beam splitter 55 after being given appropriate two-dimensional light distribution by spatial light modulator 63. The light flux transmitted through polarizing beam splitter 55 is converted into circularly polarized light by quarter wavelength plate 65, then, it goes straight through dichroic prism 51 to enter objective lens 20, and it is converged onto reference surface 81 of optical disc 80 by the objective lens 20. The light flux is reflected with being diffracted and modulated by hologram in the vicinity of first reference surface 81 and goes backward through the objective lens 20 and dichroic prism 51. Then, the light flux is converted into straight polarized light by quarter wavelength plate 65, and is reflected by polarizing beam splitter 55 to enter first photodetector 41. By using output signals of the first photodetector 41, a hologram image at the present detection position of optical disc 80 can be obtained.

At this time, changes in quantity of light caused by changes in a form or by changes in position of a spot on second photodetector 42 are detected to conduct focus detection and track detection. Based on these detections, biaxial actuator 67 moves objective lens 20 in the optical axis direction so that a light flux emitted from second laser light source 32 may be converged onto second reference surface 82 of optical disc 80 and a spot may be formed. Biaxial actuator 67 further moves objective lens 20 in the direction perpendicular to the optical axis direction so that the light flux emitted from second laser light source 32 may form an image on a prescribed track. At this case, a working distance from the objective lens 20 to the optical disc 80 in operations employing the second laser light source 32 is the same as a working distance in operations employing the first laser light source 31, as stated above. In addition, the light flux emitted from the first laser light source 31 and the light flux emitted from the second laser light source 32 are converged onto the same axis. Therefore, the light flux emitted from the first laser light source 31 is caused to form an image automatically on the first reference surface 81 of optical disc 80, by the tracking operation and the focusing operation stated above. In addition, spherical aberration of the light flux that is converged onto the second reference surface 82 of optical disc 80 is substantially the same as that of the light flux converged onto the first reference surface 81, which enables recording and reproducing information with high-precision.

EXAMPLE

A specific example of an optical system incorporated in optical pickup apparatus 10 in FIG. 1 will be explained as follows. Incidentally, in the following Table 1 and Table 3, "−4.3195×E−1", for example, means "−4.3195×10$^{-1}$".

In the present example, first wavelength $\lambda_1$ is 532 nm, second wavelength $\lambda_2$ is 655 nm, first depth $t_1$ of optical disc is 1.2 mm, second depth $t_2$ is 1.8 mm, first magnification $m_1$ corresponding to first wavelength $\lambda_1$ is 0 and second magnification $m_2$ corresponding to second wavelength $\lambda_2$ is −0.0632.

TABLE 1

| λ1 | 532 nm | λ2 | 655 nm | a | 4.3195E−01 |
|---|---|---|---|---|---|
| t1 | 1.2 mm | t2 | 1.8 mm | b | 2.7361E−04 |
| m1 | 0 | m2 | −0.0632 | c | 3.3561E−03 |
| WD1 | 1.2065 mm | WD2 | 1.2065 mm | | |
| NA1 | 0.5 | NA2 | 0.5 | | |
| SA1 | 0.005 λ rms | SA2 | −0.003 λ rms | | |

In this case, there is no substantial difference mutually in each of working distances $WD_1$ and $WD_2$, numerical apertures $NA_1$ and $NA_2$ and spherical aberrations $SA_1$ and $SA_2$. Meanwhile, when calculating spherical aberration $SA_2$, the expression (3) below was used, and values in Table 1 were used as coefficients a, b and c. Incidentally, coefficient a means wavelength-dependency (ΔSA/Δλ (rms/mm)) of spherical aberration in the vicinity of $\lambda_1$, coefficient b means substrate thickness characteristic (ΔSA/Δt (rms/mm)) of spherical aberration for $\lambda_1$, and coefficient c means magnification characteristic (ΔSA/Δm (rms)) of spherical aberration for $\lambda_1$.

$$SA_2 = SA_1(\lambda_1/\lambda_2) + \{a(\lambda_1-\lambda_2) + b(t_1-t_2) + c(m_1-m_2)\}/\lambda_2 \quad (3)$$

Specifications of the objective lens relating to the example above are shown in the following Table 2. In the Table 2, "$i^{th}$ surface" shows a surface number of a lens surface counted from the light source side, "$r_i$" shows a radius of curvature of the corresponding lens surface, each of "$d_i$(532 nm)" and "$d_i$(655 nm)" shows a distance from the corresponding lens surface to the next lens surface on the optical axis and each of "$n_i$(532 nm)" and "$n_i$(655 nm)" shows a refractive index of a medium from the corresponding lens surface to the next lens surface.

TABLE 2

| | $i^{th}$ surface | ri | di (532 nm) | ni (532 nm) | di (655 nm) | ni (655 nm) | |
|---|---|---|---|---|---|---|---|
| | 0 | | ∞ | | 80.515 | | |
| | 1 | ∞ | 2.7030 | | 2.7030 | | Aperture diameter φ5.0 mm |
| L1 | 2 | −3.5466 | 3.0000 | 1.4898 | 3.0000 | 1.4854 | |
| | 3 | −4.8525 | 1.0000 | 1.0000 | 1.0000 | 1.0000 | |
| L2 | 4 | 7.6028 | 2.1286 | 1.5480 | 2.1286 | 1.5420 | |
| | 5 | −19.3068 | 0.3231 | 1.0000 | 0.3231 | 1.0000 | |
| L3 | 6 | 4.6817 | 4.6000 | 1.5480 | 4.6000 | 1.5420 | |
| | 7 | 4.3208 | 1.2065 | 1.0000 | 1.2065 | 1.0000 | |
| | 8 | ∞ | 1.200 | 1.5895 | 1.800 | 1.5775 | |
| | 9 | ∞ | | 1.0000 | | 1.0000 | |

In the Table 2 above, each optical surface is formed of a refractive optical interface, and each of the fourth surface, the sixth surface and the seventh surface among optical surfaces is an aspheric surface. Conic constant κ and aspheric surface coefficient $A_{2i}$ of each surface are given by the following Table 3.

TABLE 3

Aspheric surface data

| | Aspheric surface coefficient | |
|---|---|---|
| Fourth surface | κ | −1.2491 × E−0 |
| | A4 | −1.5938 × E−4 |
| Sixth surface | κ | −7.9809 × E−1 |
| | A4 | +1.3939 × E−3 |
| | A6 | +5.1332 × E−5 |
| | A8 | +5.1480 × E−7 |
| | A10 | +1.2917 × E−7 |
| | A12 | −5.1703 × E−9 |
| Seventh surface | κ | −4.4200 × E−0 |
| | A4 | +1.3187 × E−2 |
| | A6 | +5.3832 × E−3 |
| | A8 | −4.6534 × E−3 |
| | A10 | +1.5939 × E−3 |
| | A12 | −2.4614 × E−4 |

In the Table 3 above, a form of an aspheric surface is given by the following expression (Numeral 1) under the following assumption.

x: Distance from a tangential plane passing through a vertex of the aspheric surface to the point on the aspheric surface whose height from the optical axis is h h: Height from the optical axis c: Curvature at the vertex of the aspheric surface (=1/r)

κ: Conic constant $A_{2i}$: Aspheric surface coefficient of $(2i)^{th}$ order (i represents natural numbers of not less than 2)

$$x = \frac{h^2 \cdot c}{1 + \sqrt{1 - (1+\kappa)h^2 \cdot c^2}} + \sum_{i=2} A_{2i} h^{2i} \quad \text{[Numeral 1]}$$

Figure 4:
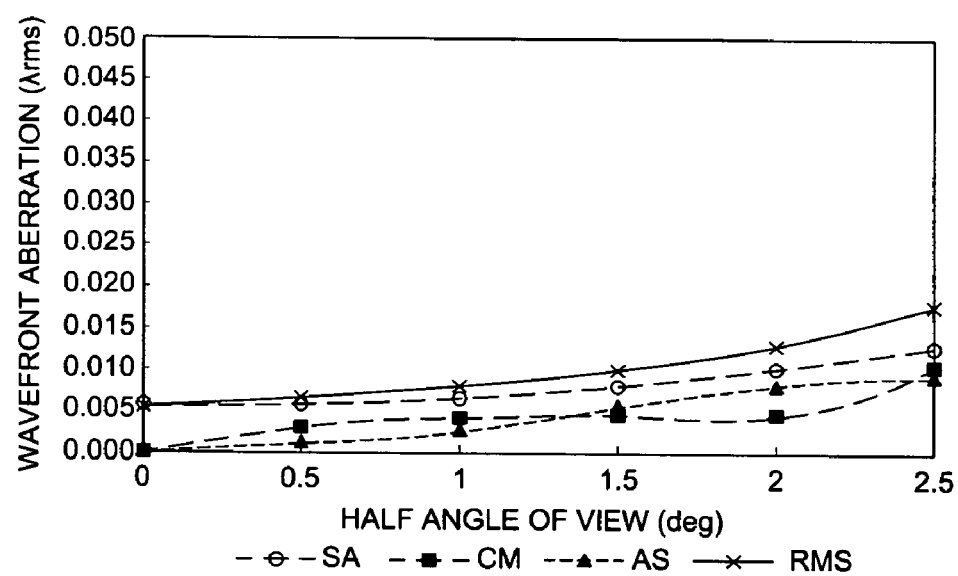
FIG. 4 shows an amount of wavefront aberration in the case where a half angle of view is changed properly.

FIG. 4 shows an amount of wavefront aberration in the case where a half angle of view is changed properly, concerning the objective lens in the present example. In the graph, a white circle mark shows SA (spherical aberration), a black square mark shows CM (coma), a black triangle mark shows AS (astigmatism) and an X mark shows RMS (the root mean square of the aforesaid aberrations).

Though the present invention has been explained above, referring to the embodiment, the invention is not limited to the embodiment stated above. For example, though optical pickup apparatus 10 has been explained as one for hologram recording and reproducing, the optical pickup apparatus 10 can also be modified to an optical pickup apparatus capable of conducting reproducing and recording of information for plural optical discs such as CD and DVD. Specifically, first laser light source 31, for example, emits a light flux having $\lambda_1$=655 nm for DVD, first photodetector 41 is provided with a quadrant sensor having the structure equal to that of second photodetector 42. Further, second laser light source 32 emits a light flux having $\lambda_2$=785 nm for CD, and second photodetector 42 detects this light flux having $\lambda_2$=785 nm. In this case, it is also possible to make both working distances for both optical discs CD and DVD to be equal each other and to reduce power consumption effectively in the case of focusing and tracking operations, by determining properly four parameters $t_1$, $t_2$, $m_1$ and $m_2$ (for example, both magnifications $m_1$ and $m_2$) excluding $\lambda_1$ and $\lambda_2$ among six parameters $\lambda_1$, $\lambda_2$, $t_1$, $t_2$, $m_1$ and $m_2$, so that each of the aforesaid expressions (1) and (2) may come to zero. Though the foregoing has been the explanation for the apparatuses compatible for CD and DVD, the same establishment as that for the apparatus compatible for CD and DVD, makes it possible to maintain the working distances, to form a spot light stably before and after wavelength changing, and to reduce power consumption in the course of focusing, even in the case of apparatus compatible for DVD and Blu-ray Disc.

INDUSTRIAL APPLICABILITY

The present invention makes it possible to obtain an optical pickup apparatus wherein aberrations of light-converging optical systems for a pair of different wavelengths are made to agree with each other without using a diffractive optical surface which tends to cause a loss of light quantity, and working distances are made to be equal each other.

What is claimed is:

1. An optical pickup system comprising:
a first light source emitting a light flux with a first wavelength;
a second light source emitting a light flux with a second wavelength which is different from the first wavelength; and
a light-converging optical system
converging the light flux with the first wavelength from the first light source with a first magnification onto a first reference surface set at a first depth from a surface of an optical information recording medium, and
converging the light flux with the second wavelength from the second light source with a second magnification onto a second reference surface set at a second depth, which is different from the first depth, in the optical information recording medium where the first reference surface is formed,
wherein the first and second wavelengths, the first and second depths, and the first and second magnifications satisfy:
a first condition that an aberration generated when the light flux from the first light source is converged onto the first reference surface is substantially a same to an aberration generated when the light flux from the second light source converged onto the second reference surface; and
a second condition that a working distance of the light-converging optical system converging the light flux from the first light source onto the first reference surface is substantially a same to a working distance of the light-converging optical system converging the light flux from the second light source onto the second reference surface.

2. The optical pickup system of claim 1, wherein the optical information recording medium is a recording medium for a hologram.

3. The optical pickup system of claim 1, wherein in the first condition, the aberration generated when the light flux from the first light source is converged onto the first reference surface is substantially zero.

4. The optical pickup system of claim 1, further comprising:
a first photodetector detecting a light flux with the first wavelength emitted from the first reference surface, through the light-converging optical system; and
a second photodetector detecting a light flux with the second wavelength emitted from the second reference surface, through the light-converging optical system.

5. The optical pickup system of claim 1, wherein the second reference surface includes a mark for a focus servo operation or a tracking servo operation thereon.

6. The optical pickup system of claim 1, wherein each optical surface of the light-converging optical system is formed of a refractive surface and the light-converging optical system does not include a diffractive optical surface.

7. An optical system for use in the optical pickup system of claim 1, the optical system comprising:
the light-converging optical system.

8. An optical information recording medium used for the optical pickup system of claim 1, comprising:
the first and second reference surfaces.

9. An optical pickup system, comprising:
a first light source emitting a light flux with a first wavelength;
a second light source emitting a light flux with a second wavelength which is different from the first wavelength; and
a light-converging optical system
converging the light flux with the first wavelength from the first light source with a first magnification onto a first reference surface set at a first depth from a surface of an optical information recording medium, and
converging the light flux with the second wavelength from the second light source with a second magnification onto a second reference surface set at a second depth which is different from the first depth,
wherein each optical surface of the light-converging optical system is formed of a refractive surface and the light-converging optical system does not include a diffractive optical surface, and
wherein the first and second wavelengths, the first and second depths, and the first and second magnifications satisfy
a first condition that an aberration generated when the light flux from the first light source is converged onto the first reference surface is substantially a same to an aberration generated when the light flux from the second light source converged onto the second reference surface; and a second condition that a working distance of the light-converging optical system converging the light flux from the first light source onto the first reference surface is substantially a same to a working distance of the light-converging optical system converging the light flux from the second light source onto the second reference surface.

10. The optical pickup system of claim 9, wherein the first reference surface and the second reference surface are formed in a same optical information recording medium as two layers.

11. An optical information recording medium used for the optical pickup system of claim 10, comprising:
the first and second reference surfaces.

12. The optical pickup system of claim 9, wherein the first reference surface and the second reference surface are formed in two different types of optical information recording media, respectively.

13. An optical system for use in the optical pickup system of claim 9, the optical system comprising the light-converging optical system.

* * * * *